United States Patent [19]

Sabins

[11] Patent Number: 4,479,296
[45] Date of Patent: Oct. 30, 1984

[54] METHOD OF MANUFACTURING A RUBBER SHOE SOLE

[75] Inventor: Kenneth C. Sabins, Windsor, Vt.

[73] Assignee: The Goodyear Tire & Rubber Company, Akron, Ohio

[21] Appl. No.: 487,399

[22] Filed: Apr. 21, 1983

[51] Int. Cl.³ .............................................. B23P 17/00
[52] U.S. Cl. .................................. 29/527.1; 264/552;
264/266; 264/275; 72/343
[58] Field of Search .......................... 29/527.2, 527.4;
264/266, 259, 271, 279, DIG. 64, 552

[56] References Cited

U.S. PATENT DOCUMENTS 3,648,358  3/1972  Cannady, Jr. et al. ............. 29/527.4

Primary Examiner—Howard N. Goldberg
Assistant Examiner—V. K. Rising
Attorney, Agent, or Firm—Alvin T. Rockhill

[57] ABSTRACT

This invention reveals a method of manufacturing a rubber shoe sole having a decorative metal piece incorporated therein comprising molding a metal slug to comply to the shape of a fenced area in a shoe mold while simultaneously shaping and vulcanizing a rubber slug in the shape of said shoe mold at a temperature sufficient to vulcanize said rubber slug with the provision that said temperature be from about 0° C. to about 80° C. less than the melting point of said metal slug. This invention more specifically discloses a method for the manufacture of a rubber shoe sole having a decorative metal piece incorporated therein comprising:

(a) placing a metal slug in a fenced area of a shoe mold;
(b) placing an uncured rubber slug on top of the metal slug in said shoe mold;
(c) closing said shoe mold; and
(d) applying a sufficient amount of heat and pressure to said mold so as to simultaneously shape said metal slug and to shape and vulcanize said rubber slug, said metal slug having a melting temperature from about 0° C. to 80° C. greater than the temperature used to vulcanize said rubber slug.

18 Claims, 4 Drawing Figures

METHOD OF MANUFACTURING A RUBBER SHOE SOLE

TECHNICAL FIELD

This invention relates to a method for producing a rubber shoe sole with a metal piece incorporated therein. Such a metal piece can be incorporated into a shoe sole as an ornament in order to enchance the soles astatic value. This invention discloses a novel technique for forming such a decorative metal piece and for attaching it to a rubber shoe sole.

SUMMARY OF THE INVENTION

Soles for boots, shoes, and the like are presently fabricated as distinct articles of manufacture for sale to shoe and boot manufacturers. These soles are affixed, as by sewing, gluing or the like, to an upper portion of a shoe or boot in a terminal stage of manufacture.

This invention reveals a method for shaping a decorative metal piece and for incorporating it into a shoe sole utilizing a one step process. It is anticipated that by utilizing the method of this invention that shoe soles with decorative metal pieces attached thereto (incorporated therein) can be produced at greatly reduced costs.

Normally decorative metal pieces are molded and attached to shoe soles utilizing a three step process. In the first step, the decorative metal piece is formed by molding at elevated temperatures to the desired shape or design. In the second step of such a process, the rubber sole is formed and vulcanized using a compression molding process. Finally, the decorative metal piece is attached to the rubber sole using an adhesive or some mechanical means of attachment. By employing the method of this invention this cumbersome three-step process can be reduced to a relatively simple one-step procedure.

The one-step process of this invention shapes and vulcanizes the rubber sole while simultaneously shaping the decorative metal piece and incorporating it into the shoe sole. The method disclosed in this invention, for the manufacture of a rubber shoe sole with a decorative metal piece incorporated therein comprises: molding a metal slug to comply to the shape of a fenced area in a shoe mold while simultaneously vulcanizing a rubber slug in the shape of said shoe mold at a temperature of from about 160° C. to about 200° C., wherein said metal slug has a melting point of about 0° C. to about 80° C. higher than the temperature used in said vulcanization. This invention also reveals a method for the manufacture of a rubber shoe sole having a decorative metal piece incorporated therein comprising:

(a) placing a metal slug in a fenced area of a shoe mold;
(b) placing an uncured rubber slug on top of the metal slug in said shoe mold;
(c) closing said shoe mold; and
(d) applying a sufficient amount of heat and pressure to said mold so as to simultaneously shape said metal slug and to shape and vulcanize said rubber slug, said metal slug having a melting temperature from about 0° C. to 80° C. greater than the temperature used to vulcanize said rubber slug.

Essentially this invention reduces the cumbersome three-step process of forming a decorative metal piece, forming and vulcanizing a rubber sole, and attaching the decorative metal piece to the rubber sole to a very simple one-step process that simultaneously forms the decorative metal piece, forms and vulcanizes the rubber sole, and incorporates the metal piece into the shoe sole. By utilizing the method of this invention the metal piece is affixed to the shoe sole in such a way that it is highly visible and can therefore add to the astatic value of the soles.

DETAILED DESCRIPTION

The present invention will become more apparent from the following detailed description and accompanying drawings, in which.

Figure 1:
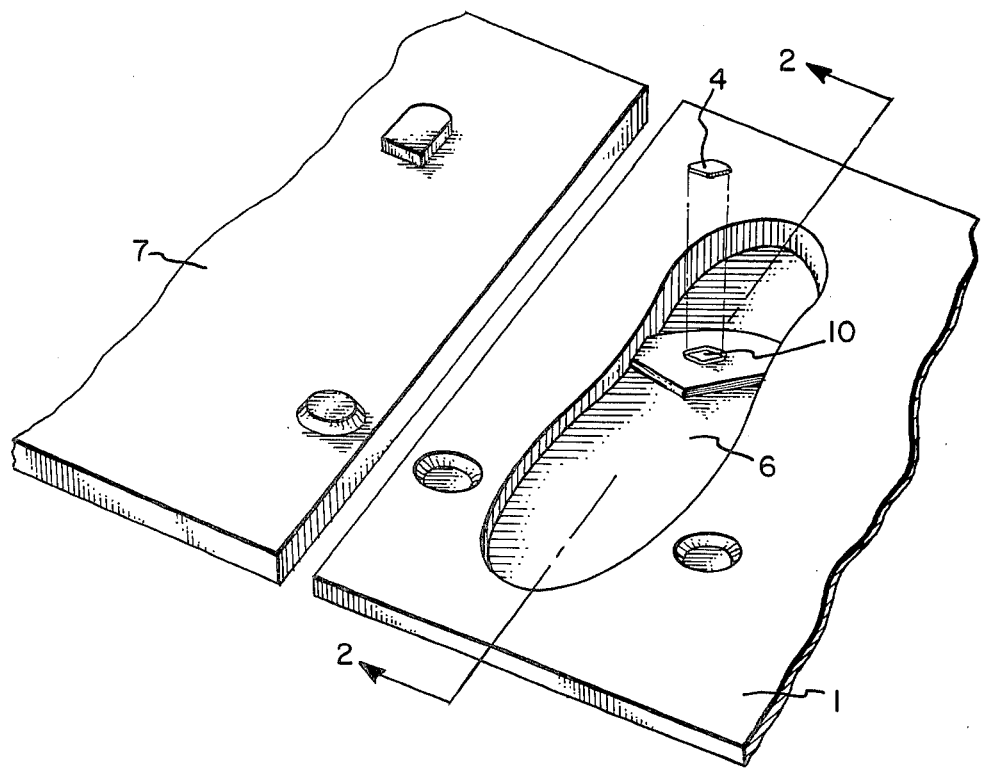
FIG. 1 is a top view of a shoe mold suitable for use in carrying out this invention.
Figure 2:
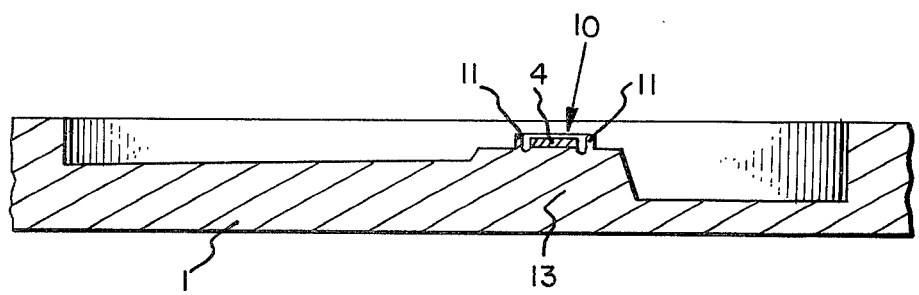
FIG. 2 is a cross-sectional view taken along line 2 of FIG. 1.
Figure 4:
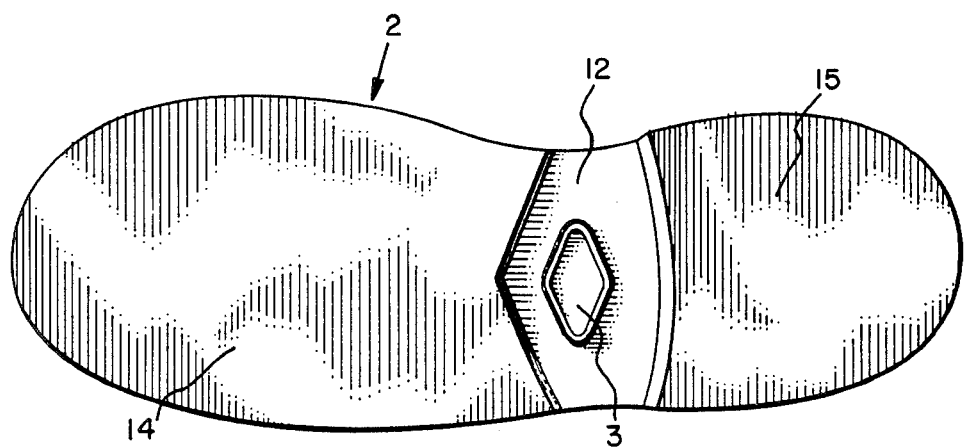
FIG. 4 is a top view of a rubber shoe sole having a decorative metal piece incorporated therein.

This invention can be practiced using standard compression molding equipment which is suitable for the compression molding of shoe soles in general. The shoe molds used in the practice of this invention must, however, contain a fenced area which is capable of holding the metal slug in place during the compression molding process with this fenced area being of the design desired for the decorative metal piece. FIGS. 1 and 2 best show such a fenced area 10 in shoe mold 1. The fenced area 10 of shoe mold 1 should be enclosed on all four sides with a fence 11, as can be best seen in FIG. 2. Fence 11 is essentially a raised portion on mold 1 capable of holding a metal slug in place during the compression molding process in which it is formed into a decorative metal piece incorporated into the rubber shoe sole. It is normally desirable for decorative metal piece 3 to be incorporated into the shank area 12 of shoe sole 2, this relationship can best be seen in FIG. 4. Thus, it is generally desirable for fenced area 10 and fence 11 to be in the shank portion 13 of shoe mold 1. The shank area 12 of sole 2 is a good place to incorporate the decorative metal piece 3 because there is a lower likelihood of it being scuffed since the shank area 12 of sole 2 does not normally come in contact with the ground during walking. The shank area 12 of sole 2 is also a convenient place to put a decorative metal piece 3 since it will not normally interfer with the tread on the ground contacting surface of the sole if such a tread is desired. Of course, it is within the scope of this invention to incorporate a decorative metal piece 3 any where on the surface of a shoe sole 2. For example, a decorative metal piece 3 can be incorporated into the ball area 14 of a shoe sole 2, however, this is not generally recommended since the ball area 14 of a shoe sole 2 normally comes in contact with the ground during walking and therefore the decorative metal piece would be very likely to become scuffed and cut during walking. A decorative metal piece 3 can also be incorporated into the heal 15 of a shoe sole 2, but this is not generally recommended either for the same reasons. Such a decorative metal piece 3 and its corresponding fenced area 10 is represented in the figures as being of a diamond shape. Such a diamond shape is certainly not critical to this invention and it is within the scope of this invention for the decorative metal piece to be of other designs, such as squares, circles, rectangles, parallelograms, and the like.

In order to practice the process of this invention a metal slug 4, that is approximately the same shape as the fenced area 10 of shoe mold 1 is placed in the fenced area 10 of shoe mold 1. Metal slug 4 must be comprised of a metal or alloy of two or more metals which has a melting point from about 0° C. to about 80° C. greater than the vulcanization temperature used to cure the rubber shoe sole. It is generally preferred for the metal slug to have a melting point from about 2° C. to about 60° C. greater than the temperature used to vulcanize the rubber in the shoe sole. It is more preferred for the metal slug to have a melting point from 30° C. to 50° C. greater than the temperature used to vulcanize the rubber in the shoe sole.

The vulcanization temperature generally used to cure rubber shoe soles ranges from about 160° C. to about 200° C. It is generally preferred for this vulcanization temperature to be about 180° C. Therefore, the melting point of the metal from which the metal slug is comprised can range from about 160° C. to about 260° C. It is preferred for this metal to have a melting point ranging from 190° C. to 250° C. It is most preferred for the metal to have a melting point of about 220° C.

Various mixtures (alloys) of lead and tin are preferred as the metal of which the metal slug is comprised. Pure tin has a melting point of about 232° C., therefore, pure tin can be used as the metal of which the metal slug is comprised in the practice of this invention. Generally it will be preferred to employ a combination of tin and lead for this purpose. Such combinations of tin and lead will contain from about 30 weight percent to about 99 weight percent in and from about 1 weight percent to about 70 weight percent lead. Mixtures of 30 percent tin and 70 percent lead have a melting point of about 262° C., mixtures of 50 percent tin and 50 percent lead have a melting point of about 220° C., and mixtures of 70 percent tin and 30 percent lead have a melting point of about 185° C. Mixtures of 50 percent tin and 50 percent lead have proven to be very satisfactory in carrying out the process of this invention. Various other more exotic metal alloys can also be used as the metal slug. For example, a mixture of 70 to 95 percent by weight bismuth and 5 to 30 weight percent lead can be used as the metal. A combination of 90 to 99 weight percent tin and 1 to 10 weight percent antimony can also be used as the metal for the metal slug. The metal slugs used in the process of this invention will generally be stamped in such a way so as to conform approximately to the shape of the fenced area in the shoe mold. The metal slugs used in the practice of this invention can very substantially in size and weight depending upon the size of the decorative metal piece that is being incorporated into the shoe sole. It has been determined that slugs weighing from about 360 grams to about 380 grams and having a thickness of 0.03 to 0.04 inches (0.076 to 0.102 centimeters) are very satisfactory for carrying out the process of this invention.

It is generally desirable to apply an adhesive to the top surface of the metal slug that will come in contact with the rubber slug that is placed on top of it in the mold. It is preferably for the adhesive employed to be selected from those designed for adhering metal to rubber. For example, Tycel ™, sold by Hughson Chemicals can be employed very successfully. A person skilled in the art will be able to ascertain the specific type and quantity of adhesive that will be most beneficial in improving the adhesion between the specific rubber and metal employed in the shoe sole.

FIG. 2 shows the metal slug 4 after it has been placed in the fenced area 10 of shoe mold 1. After the metal slug has been placed in the fenced area of the shoe mold then the uncured rubber slug 5 is placed on top of the metal slug 4 in said shoe mold 1. The uncured rubber slugs used in the process of this invention are the same as those used in standard compression molding techniques by those skilled in the art of molding shoe soles. This uncured rubber slug 5 should comply roughly with the shape of the shoe sole 2 desire. Therefore, uncured rubber slug 5 should also roughly comply to the size and shape of mold cavity 6 in shoe mold 1. The type of rubber from which rubber slug 5 is comprised is not critical to the process of this invention. Some representative rubbers from which rubber slug 5 can be comprised include styrene butadiene rubber (SBR), butadiene rubber, nitrile rubber, and carboxylated nitrile rubber. The uncured rubber employed as rubber slug 5 will generally contain sulfur, antioxidants, scorch inhibiting agents, accelerators, and other additives commonly known to those skilled in the art.

Figure 3:
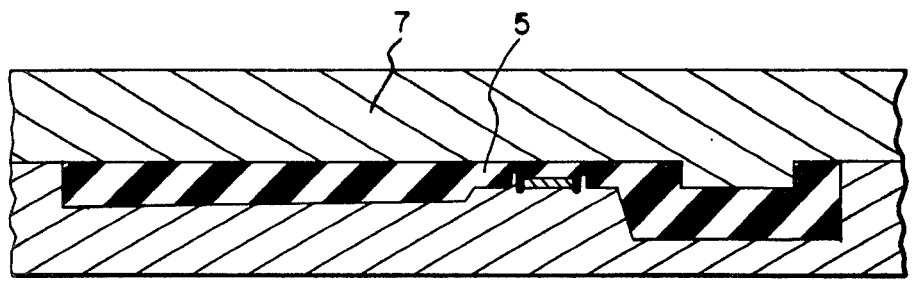
FIG. 3 is a cross-sectional view taken along line 2 of FIG. 1 in which the mold is closed, showing the metal piece and rubber slug in their prospective positions in the mold.

After rubber slug 5 is placed on top of metal slug 4 in the mold cavity 6 of shoe mold 1, the shoe mold is closed (press plate 7 is clamped against shoe mold 1 as shown in FIG. 3). Press plate 7 is pushed against rubber slug 5 and shoe mold 1 with sufficient force so as to produce a pressure of at least about 1,000 pounds per square inch ($6.9 \times 10^6$ pascals). More preferably this compression molding process will be carried out employing a pressure ranging from about 1,800 pounds per square inch ($1.24 \times 10^7$ pascals) to about 2,000 pounds per square inch ($1.38 \times 10^7$ pascals). The mold should also be heated to the desired vulcanization temperature. It is generally preferred for this vulcanization temperature to range from about 160° C. to about 200° C. and it is more preferred for the vulcanization temperature employed to be about 180° C. The amount of time needed in this cure cycle (amount of time necessary to vulcanize the rubber slug and to shape the metal slug) will vary with the vulcanization temperature employed. It is generally preferred for the cure cycle to range from about 8 to about 14 minutes. It is most preferred for the cure cycle to last about 10 minutes. After the completion of the cure cycle, the mold can be opened and the rubber shoe sole having the decorative metal piece incorporated therein can be removed.

What is claimed is:

1. A method for the manufacture of a rubber shoe sole having a decorative metal piece incorporated therein comprising:
    (a) placing a metal slug in a fenced area of a shoe mold;
    (b) placing an uncured rubber slug on top of the metal slug in said shoe mold;
    (c) closing said shoe mold; and
    (d) applying a sufficient amount of heat and pressure to said mold so as to simultaneously shape said metal slug and to shape and vulcanize said rubber slug, said metal slug having a melting temperature from about 0° C. to 80° C. greater than the temperature used to vulcanize said rubber slug.

2. A method for the manufacture of a rubber shoe sole with a decorative metal piece incorporated therein comprising molding a metal slug to comply to the shape of a fenced area in a shoe mold while simultaneously vulcanizing a rubber slug in the shape of said shoe mold at a temperature sufficient to vulcanize said rubber slug with the provision that said temperature be from about 0° C. to about 80° C. less than the melting point of said metal slug.

3. A method for the manufacture of a rubber shoe sole with a decorative metal piece incorporated therein comprising molding a metal slug to comply to the shape of a fenced area in a shoe mold while simultaneously vulcanizing a rubber slug in the shape of said shoe mold at a temperature of about 160° C. to about 200° C. wherein said metal slug has a melting point of about 0° C. to about 80° C. higher than the temperature used in said vulcanization.

4. A method as specified in claim 1 wherein said melting temperature is from about 2° C. to about 60° C. greater than the temperature used to vulcanize said rubber slug.

5. A method as specified in claim 4 wherein said melting temperature is from about 30° C. to about 50° C. greater than the temperature used to vulcanize said rubber slug.

6. A method as specified in claim 1 wherein said metal slug is comprised of a mixture of from 30 to 99 weight percent tin and from 1 to 70 weight percent lead.

7. A method as specified in claim 1 wherein said metal slug is comprised of tin.

8. A method as specified in claim 6, wherein said metal slug is comprised of a mixture of about 50 percent lead and about 50 percent tin by weight.

9. A method as specified in claim 1, wherein the temperature used to vulcanize said rubber slug is from about 160° C. to about 200° C.

10. A method as specified in claim 9 wherein the temperature used to vulcanize said rubber slug is about 180° C.

11. A method as specified in claim 1 wherein an adhesive is applied to said metal slug prior to placing said uncured rubber slug in said show mold.

12. A method as specified in claim 1 wherein said rubber slug is comprised of at least 1 rubber selected from the group consisting of styrene butadiene rubber, butadiene rubber, nitrile rubber, and carboxylated nitrile rubber.

13. A method as specified in claim 2 wherein said temperature is from about 2° C. to about 60° C. greater than the temperature used to vulcanize said rubber slug.

14. A method as specified in claim 13 wherein said temperature is from about 30° C. to about 50° C. greater than the temperature used to vulcanize said rubber slug.

15. A method as specified in claim 3 wherein said melting point is from about 2° C. to about 60° C. greater than the temperature used to vulcanize said rubber slug.

16. A method as specified in claim 15 wherein said melting point is from about 30° C. to about 50° C. greater than the temperature used to vulcanize said rubber slug.

17. A method as specified in claim 2 wherein an adhesive is applied to said metal slug prior to said molding and said vulcanizing.

18. A method as specified in claim 3 wherein an adhesive is applied to said metal slug prior to said molding and said vulcanizing.

* * * * *